USO11719178B2

(12) United States Patent
Haranahalli Panchakshari

(10) Patent No.: US 11,719,178 B2
(45) Date of Patent: Aug. 8, 2023

(54) APPARATUS AND METHOD FOR CONTROLLING A VEHICLE ACTION

(71) Applicant: JAGUAR LAND ROVER LIMITED, Coventry (GB)

(72) Inventor: Bhanuprakash Haranahalli Panchakshari, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 17/689,464

(22) Filed: Mar. 8, 2022

(65) Prior Publication Data

US 2022/0282679 A1 Sep. 8, 2022

(30) Foreign Application Priority Data

Mar. 8, 2021 (GB) ...................................... 2103163

(51) Int. Cl.
*F02D 41/02* (2006.01)
*F02D 41/14* (2006.01)
(Continued)

(52) U.S. Cl.
CPC ..... *F02D 41/0275* (2013.01); *F02D 41/0245* (2013.01); *F02D 41/146* (2013.01); *F01N 3/0828* (2013.01); *F01N 3/0842* (2013.01); *F01N 3/0871* (2013.01); *F01N 3/0885* (2013.01); *F01N 3/206* (2013.01); *F01N 2560/026* (2013.01); *F01N 2900/1614* (2013.01); *F01N 2900/1621* (2013.01); *F01N 2900/1622* (2013.01)

(58) Field of Classification Search
CPC combination set(s) only.
See application file for complete search history.

(56) References Cited

U.S. PATENT DOCUMENTS

2007/0240407 A1 10/2007 Ruth et al.
2008/0314031 A1 12/2008 Shamis
(Continued)

FOREIGN PATENT DOCUMENTS

KR 101619411 B1 5/2016
WO 2005124113 A2 12/2005

OTHER PUBLICATIONS

Combined Search and Examination Report corresponding to Great Britain Application No. GB2103163.8, dated Jun. 29, 2021, 5 pages.
(Continued)

*Primary Examiner* — Binh Q Tran
(74) *Attorney, Agent, or Firm* — Reising Ethington P.C.

(57) ABSTRACT

A control system for a vehicle, the control system having one or more controllers, the control system being arranged to: determine a likelihood of a NOx adsorber trap of a vehicle requiring purging; determine an efficiency of purging the NOx adsorber trap; determine an operating efficiency of a selective catalyst reduction system of the vehicle; determine a schedule for purging of the NOx adsorber trap of the vehicle in dependence on the likelihood of the NOx adsorber trap requiring purging, the efficiency of purging the NOx adsorber trap, and the operating efficiency of the selective catalyst reduction system; and control purging of the NOx adsorber trap according to the schedule.

19 Claims, 13 Drawing Sheets

(51) Int. Cl.
*F01N 3/08* (2006.01)
*F01N 3/20* (2006.01)

(56) References Cited

U.S. PATENT DOCUMENTS

| | | | |
|---|---|---|---|
| 2010/0043397 A1* | 2/2010 | Wang | F01N 11/007 60/276 |
| 2011/0047970 A1* | 3/2011 | Yezerets | F01N 3/0842 60/276 |
| 2011/0131949 A1* | 6/2011 | Adams | F02D 41/1448 60/274 |
| 2016/0123260 A1 | 5/2016 | Bromham et al. | |
| 2016/0290199 A1* | 10/2016 | Park | F01N 3/0842 |
| 2016/0376962 A1 | 12/2016 | Lee et al. | |
| 2017/0044962 A1* | 2/2017 | Keller | F01N 11/007 |
| 2017/0074191 A1* | 3/2017 | Kim | F01N 3/2066 |
| 2017/0248059 A1* | 8/2017 | Nagel | F01N 3/0814 |
| 2019/0242314 A1* | 8/2019 | Harmsen | F02D 41/1446 |

OTHER PUBLICATIONS

Translated German Search Report Corresponding to German Application No. 102022105059.9, dated Sep. 22, 2022, 9 pages.

* cited by examiner

APPARATUS AND METHOD FOR CONTROLLING A VEHICLE ACTION

TECHNICAL FIELD

The present disclosure relates to scheduling intermittent vehicle actions. Aspects of the invention relate to a control system, to a vehicle, to a method and computer software.

BACKGROUND

It is known to perform intermittent actions during vehicle operation for a variety of reasons. For example, some intermittent actions such as regeneration or purge procedures for aftertreatment devices within engine exhaust systems are performed to maintain efficient operation of the vehicle.

Intermittent actions such as regeneration procedures typically increase fuel consumption and may lead to increased emissions of certain types while the procedure completes. Furthermore, a timing of a regeneration procedure can affect emissions from the vehicle.

SUMMARY OF THE INVENTION

It is an aim of the present invention to address one or more of the disadvantages associated with the prior art.

Aspects and embodiments of the invention provide a control system, a system, a vehicle, a method and computer software as claimed in the appended claims According to an aspect of the present invention there is provided a control system for a vehicle, the control system comprising one or more controller, the control system being arranged to determine a prediction of an end of a current driving cycle of the vehicle and to control purging of the emissions trap prior to the prediction of the end of the current driving cycle. Advantageously the emissions trap is prepared for operation to reduce emissions of the vehicle in the next driving cycle of the vehicle.

According to another aspect of the present invention there is provided a control system for a vehicle, the control system comprising one or more controller, the control system being arranged to determine an efficiency of purging an adsorber trap, determine an efficiency of a selective catalyst reduction system of the vehicle, and determine a schedule for purging of the adsorber trap of the vehicle in dependence on the likelihood of the efficiency of purging the adsorber trap and the operating efficiency of the selective catalyst reduction system. Advantageously the purging of $NO_x$ adsorber trap is scheduled for optimum performance. Advantageously the purging of the $NO_x$ adsorber trap is scheduled to reduce emissions.

According to an aspect of the present invention there is provided a control system for a vehicle, the control system comprising one or more controller, the control system being arranged to determine a prediction of an end of a current driving cycle of the vehicle, determine a likelihood of slippage from an emissions trap of the vehicle in a next driving cycle of the vehicle in dependence on the prediction of the end of the current driving cycle, and control purging of the emissions trap prior to the prediction of the end of the current driving cycle in dependence on the likelihood of slippage. Advantageously the emissions trap is prepared for operation to reduce emissions of the vehicle in the next driving cycle of the vehicle.

The control system optionally comprises an input to receive a signal indicative of the prediction of the end of the current driving cycle of the vehicle. Advantageously the prediction may be received from a system operational to predict journeys of the vehicle. The control system optionally comprises an output to output a purge signal to cause the purge of the emissions trap. Advantageously the system is able to control the purging of the emissions trap.

The determining the likelihood of slippage from the emissions trap of the vehicle in the next driving cycle of the vehicle may comprise receiving a signal indicative of a current capacity of the emissions trap. Advantageously the current capacity of the emissions trap is a convenient indicator of the likelihood of requiring purging in the next driving cycle.

The determining the likelihood of slippage from the emissions trap of the vehicle may comprise determining a prediction of a remaining capacity of the emissions trap at the prediction of the end of the current driving cycle. Advantageously the remaining capacity of the emissions trap is a convenient indicator of the likelihood of requiring purging in the next driving cycle.

The determining the likelihood of slippage from the emissions trap of the vehicle in the next driving cycle of the vehicle optionally comprises determining an estimate of an ability of the emissions trap to capture emissions in the next driving cycle prior to an emission reduction system of the vehicle being operational. Advantageously, it is desired for the emissions trap to be operation before the emission reduction system is operational, thus purging the emissions trap before the end of the current driving cycle may improve availability during this period.

The emission reduction system of the vehicle being operational may comprise an operating temperature of the emission reduction system meeting one or more predetermined criteria. Advantageously determining or predicting the temperature of the emission reduction system provides a convenient indicator of availability.

The one or more predetermined criteria may comprise the operating temperature being between first and second temperatures. The one or more predetermined criteria may comprise the operating temperature being at least 150° C. Advantageously the emission reduction system may be sufficiently heated to be operational The one or more predetermined criteria may comprise the operating temperature being at least 200° C. Advantageously the emission reduction system may be sufficiently heated to be operating efficiently. The one or more predetermined criteria may comprise the operating temperature being less than 300° C. The one or more predetermined criteria may comprise the operating temperature being less than 275° C.

The emission reduction system of the vehicle is optionally a selective catalyst reduction system. The selective catalyst reduction system advantageously has different characteristics to the emissions trap and is able to operate whilst the emissions trap is purged. The purging of the emissions trap may be performed whilst the emission reduction system is operational. Advantageously emissions of the vehicle are reduced.

The emissions trap may be a $NO_x$ adsorber catalyst. The emissions trap may be a lean $NO_x$ trap.

The signal indicative of the prediction of the end of the current driving cycle is optionally received from navigation system associated with the vehicle. Advantageously the navigation system may be arranged to predict the end of the current driving cycle, such as based on historic information.

The prediction of the end of the current driving cycle is optionally determined in dependence on an e-horizon system associated with the vehicle. Advantageously the e-horizon system may provide information associated with the driving cycle.

According to a further aspect of the present invention there is provided a vehicle comprising a control system as described above.

According to another aspect of the present invention there is provided a method for controlling purging of an emissions trap of a vehicle, comprising predicting an end of a current driving cycle of the vehicle, determining a likelihood of slippage from the emissions trap of the vehicle in a next driving cycle of the vehicle in dependence on the prediction of the end of the current driving cycle, and purging the emissions trap prior to the prediction of the end of the current driving cycle in dependence on the likelihood of slippage.

The method comprising receiving a signal indicative of the prediction of the end of the current driving cycle of the vehicle.

The method comprising outputting a purge signal to cause the purging of the emissions trap.

The determining the likelihood of slippage from the emissions trap of the vehicle in the next driving cycle of the vehicle comprises receiving a signal indicative of a current capacity of the emissions trap.

The determining the likelihood of slippage from the emissions trap of the vehicle comprises determining a prediction of a remaining capacity of the emissions trap at the prediction of the end of the current driving cycle.

The determining the likelihood of slippage from the emissions trap of the vehicle in the next driving cycle of the vehicle comprises determining an estimate of an ability of the emissions trap to capture emissions in the next driving cycle prior to an emission reduction system of the vehicle being operational.

The emission reduction system of the vehicle being operational comprises an operating temperature of the emission reduction system meeting one or more predetermined criteria.

The one or more predetermined criteria comprise the operating temperature being between first and second temperatures.

According to a yet further aspect of the present invention there is provided computer software which, when executed by a computer, is arranged to perform a method as described above.

According to a yet further aspect of the present invention there is provided a control system for a vehicle, the control system comprising one or more controller, the control system being arranged to determine a likelihood of a $NO_x$ adsorber trap of a vehicle requiring purging, determine an efficiency of purging the $NO_x$ adsorber trap, determine an operating efficiency of a selective catalyst reduction system of the vehicle, determine a schedule for purging of the $NO_x$ adsorber trap of the vehicle in dependence on the likelihood of the $NO_x$ adsorber trap requiring purging, the efficiency of purging the $NO_x$ adsorber trap and the operating efficiency of the selective catalyst reduction system, and control purging of the $NO_x$ adsorber trap according to the schedule. Advantageously the purging of $NO_x$ adsorber trap is scheduled for optimum performance. Advantageously the purging of the $NO_x$ adsorber trap is scheduled to reduce emissions.

Scheduling the purging optionally comprises purging the $NO_x$ adsorber trap at a current point in time. Advantageously the $NO_x$ adsorber trap is purged immediately to improve overall performance.

Scheduling the purging optionally comprises determining to purge the $NO_x$ adsorber trap at a future point in time. Advantageously the purging of the $NO_x$ adsorber trap is scheduled for in future when better conditions are predicted to exist.

The control system may comprise an input means for receiving a signal indicative of the likelihood of the $NO_x$ adsorber trap of requiring purging. Advantageously the signal informs about a need to purge the adsorber trap. The signal may be a capacity signal indicative of a remaining storage capacity of the $NO_x$ adsorber trap or an amount of $NO_x$ stored in the adsorber trap. Advantageously the remaining storage capacity or the amount of $NO_x$ stored in the adsorber trap is considered to inform the likelihood of requiring purging.

The control system may comprise an output means for outputting a purge control signal for controlling purging of the $NO_x$ adsorber trap. Advantageously the system is configured to cause purging of the $NO_x$ adsorber trap.

Optionally the control system is arranged to determine the efficiency of purging the $NO_x$ adsorber trap. Advantageously the purging may be scheduled for a point in time when it is efficient to purge the $NO_x$ adsorber trap. Determining the efficiency optionally comprises determining a current efficiency of purging the $NO_x$ adsorber trap. Advantageously the efficiency of purging the $NO_x$ adsorber trap at the current time is considered.

The control system may be arranged to determine the efficiency of purging the $NO_x$ adsorber trap comprising determining a prediction of a future efficiency of purging the $NO_x$ adsorber trap. Advantageously the efficiency of purging the $NO_x$ adsorber trap at a future point in time is considered.

The control system is optionally arranged to determine the efficiency of purging the $NO_x$ adsorber trap comprising determining a temperature associated with the $NO_x$ adsorber trap. Advantageously the temperature influences the efficiency of purging the $NO_x$ adsorber trap. The temperature may be a temperature of an exhaust associated with the $NO_x$ adsorber trap. Advantageously the temperature of the exhaust influences the efficiency of purging the $NO_x$ adsorber trap and may be easily measured and/or controlled.

The control system may be arranged to determine the operating efficiency of the selective catalyst reduction system. Advantageously the purge may be scheduled according to the efficiency of the selective catalyst reduction system which may reduce emissions during the purging of the adsorber trap. Determining the efficiency may comprise determining a current operating efficiency of the selective catalyst reduction system. Advantageously the efficiency the selective catalyst reduction system at the current point in time is considered.

The control system is optionally arranged to determine the operating efficiency of the selective catalyst reduction system comprising determining a prediction of a future operating efficiency of the selective catalyst reduction system. Advantageously the efficiency the selective catalyst reduction system at a future point in time is considered.

The control system is optionally arranged to determine the operating efficiency of the selective catalyst reduction system comprising determining a temperature associated with the selective catalyst reduction system. Advantageously the temperature influences the efficiency of the selective catalyst reduction system.

The control system may be arranged to determine the schedule for purging of the $NO_x$ adsorber trap. Advantageously the schedule for purging enables purging to be performed at an optimum point in time to control emissions.

Determining the schedule may comprise controlling a purge of the $NO_x$ adsorber trap prior to said NOx adsorber trap reaching a maximum NOx storage capacity. Advantageously the $NO_x$ adsorber trap may be pre-emptively purged before it is full, which may improve future emissions.

The control system may be arranged to determine the schedule for purging of the $NO_x$ adsorber trap comprising scheduling future purge of the $NO_x$ adsorber trap. Advantageously the $NO_x$ adsorber trap scheduled for purging in future, which may improve emissions. The control system may be arranged to determine the schedule for purging of the $NO_x$ adsorber trap comprising delaying a purge of the $NO_x$ adsorber trap. Advantageously the purging of the $NO_x$ adsorber trap may be delayed to improve overall emissions. The delay may be a delay to the purge, even when the $NO_x$ adsorber trap is substantially full. The $NO_x$ adsorber trap may not be immediately purged, despite being at the maximum NOx storage capacity. The purging of the $NO_x$ adsorber trap is optionally delayed until the efficiency of purging the $NO_x$ adsorber trap improves with respect to a current efficiency of purging the $NO_x$ adsorber trap. Advantageously the overall emissions may be reduced.

The purging of the $NO_x$ adsorber trap may be delayed until the operating efficiency of the selective catalyst reduction system is determined or is predicted to improve with respect to a current operating efficiency of the selective catalyst reduction system. Advantageously the selective catalyst reduction system will reduce emissions during the purging of the $NO_x$ adsorber trap.

According to a yet further aspect of the present invention there is provided a system comprising a control system as described above, and a $NO_x$ adsorber trap controlled by the control system. The system may comprise a selective catalyst reduction system.

According to a yet further aspect of the present invention there is provided a vehicle comprising a control system as described above, or a system as described above.

According to a yet further aspect of the present invention there is provided a method for controlling purging of a $NO_x$ adsorber trap of a vehicle, comprising determining a likelihood of a $NO_x$ adsorber trap of a vehicle requiring purging, determining an efficiency of purging the $NO_x$ adsorber trap, determining an operating efficiency of a selective catalyst reduction system of the vehicle, determining a schedule for purging of the $NO_x$ adsorber trap of the vehicle in dependence on the likelihood of the $NO_x$ adsorber trap requiring purging, the efficiency of purging the $NO_x$ adsorber trap and the operating efficiency of the selective catalyst reduction system, and controlling purging of the $NO_x$ adsorber trap according to the schedule.

The determining the efficiency of purging the $NO_x$ adsorber trap may comprise determining a current efficiency of purging the $NO_x$ adsorber trap.

The determining the efficiency of purging the $NO_x$ adsorber trap may comprise determining a prediction of a future efficiency of purging the NOx adsorber trap.

The determining the efficiency of purging the $NO_x$ adsorber trap may comprise determining a temperature associated with the NOx adsorber trap.

The temperature may be a temperature of an exhaust associated with the $NO_x$ adsorber trap.

The determining the operating efficiency of the selective catalyst reduction system may comprise determining a current operating efficiency of the selective catalyst reduction system.

The determining the operating efficiency of the selective catalyst reduction system may comprise determining a prediction of a future operating efficiency of the selective catalyst reduction system.

According to a yet further aspect of the present invention there is provided computer software which, when executed by a computer, is arranged to perform a method as described above. Optionally the computer software is stored on a computer-readable medium. The computer software may be tangibly stored on the computer-readable medium.

According to a yet further aspect of the present invention there is provided a non-transitory, computer-readable storage medium storing instructions thereon that, when executed by one or more electronic processors, causes the one or more electronic processors to carry out a method as described above.

The one or more controller of a control system according to the present invention may collectively comprise at least one electronic processor having an electrical input for receiving one or more input signals and at least one memory device electrically coupled to the at least one electronic processor and having instructions stored therein.

The at least one electronic processor may be configured to access the at least one memory device and execute the instructions thereon so as to determine a prediction of an end of a current driving cycle of the vehicle and to control purging of the emissions trap prior to the prediction of the end of the current driving cycle.

The at least one electronic processor may be configured to access the at least one memory device and execute the instructions thereon so as to determine an efficiency of purging an adsorber trap, determine an efficiency of a selective catalyst reduction system of the vehicle, and determine a schedule for purging of the adsorber trap of the vehicle in dependence on the likelihood of the efficiency of purging the adsorber trap and the operating efficiency of the selective catalyst reduction system.

The at least one electronic processor may be configured to access the at least one memory device and execute the instructions thereon so as to determine a prediction of an end of a current driving cycle of the vehicle, determine a likelihood of slippage from an emissions trap of the vehicle in a next driving cycle of the vehicle in dependence on the prediction of the end of the current driving cycle, and control purging of the emissions trap prior to the prediction of the end of the current driving cycle in dependence on the likelihood of slippage.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
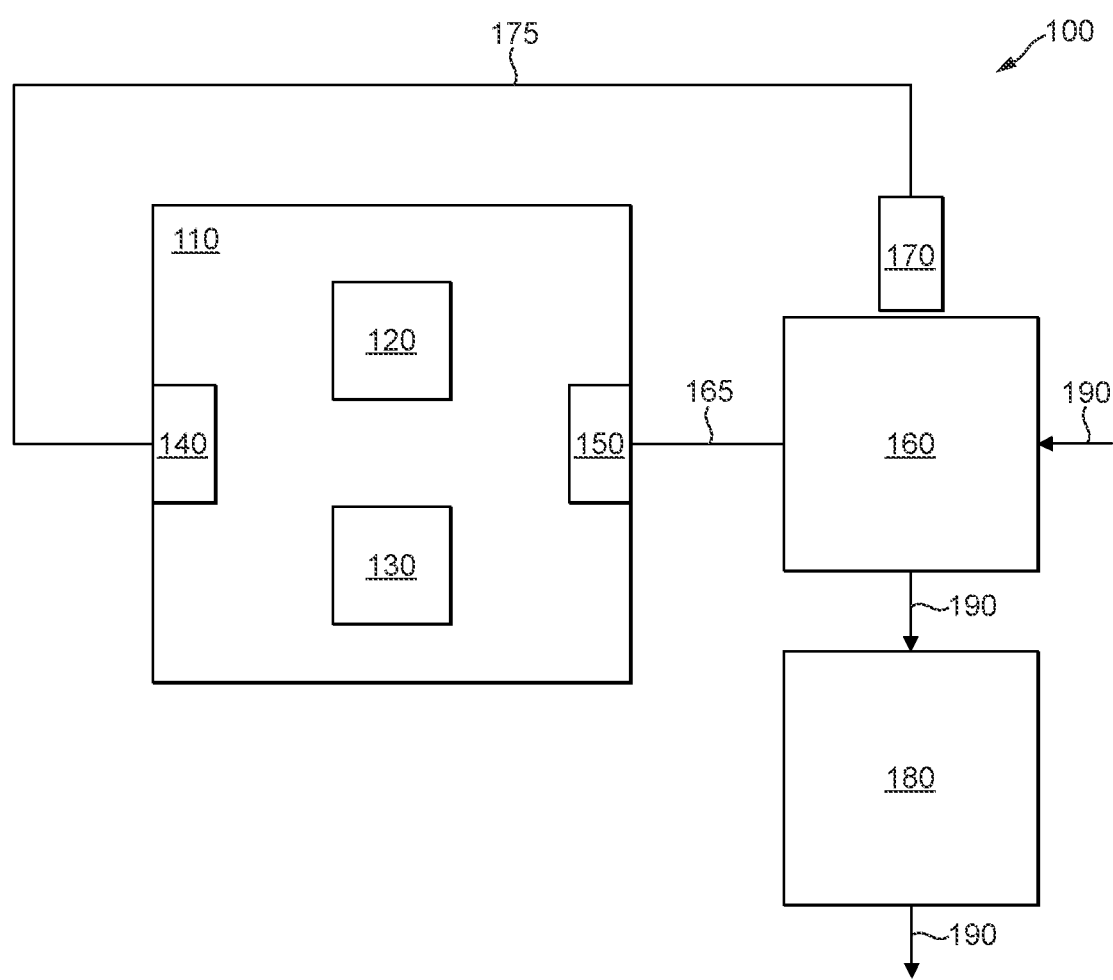
FIG. 1 shows a control system according to an embodiment of the present invention.

A control system 110 in accordance with an embodiment of the present invention is described herein with reference to the accompanying FIG. 1.

Figure 2:
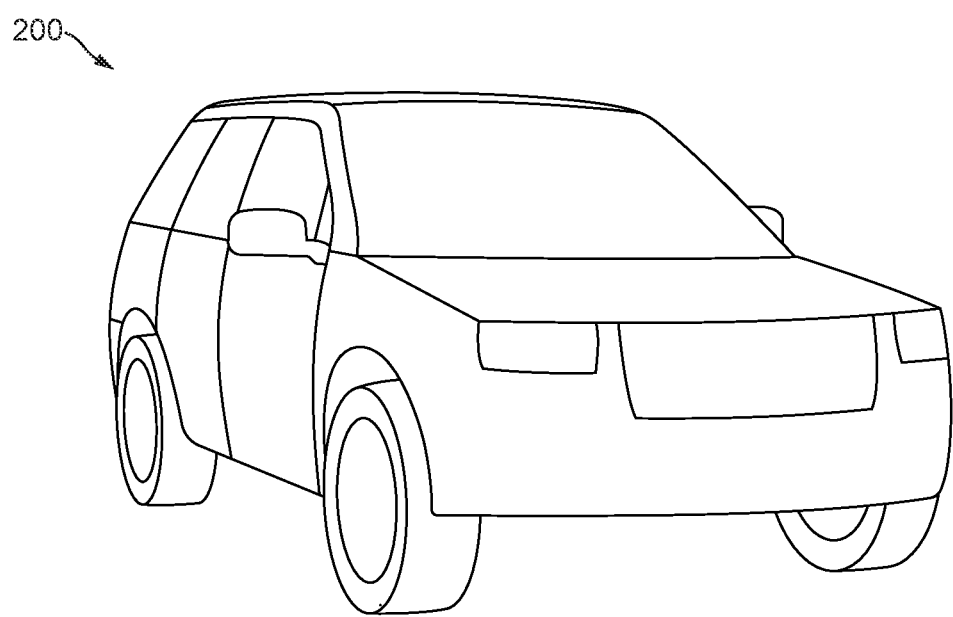
FIG. 2 shows a vehicle according to an embodiment of the present invention.

With reference to FIG. 1, the control system 110 forms part of a system 100 comprising an emissions trap 160 for a vehicle 200 such as illustrated in FIG. 2.

The system 100 may be used in the vehicle 200, such as illustrated in FIG. 2, which comprises an internal combustion engine (ICE). The ICE burns a hydrocarbon fuel, such as petrol (gasoline) or diesel, emissions from which are output from the ICE via an exhaust system. In order to reduce harmful emissions from the ICE, an exhaust system 190 of the vehicle 200 which comprises one or more aftertreatment apparatus 160, 180 for capturing components of the ICE emissions, such as one or more oxides of nitrogen e.g. nitrogen oxide ($NO_x$). It is known for such aftertreatment apparatus 160, 180 to include the emissions trap 160 and an emission reduction system 180 which uses a reductant.

The emissions trap 160 may be known as a $NO_x$ adsorber, $NO_x$ trap or a lean $NO_x$ trap (LNT) 160. The emissions trap 160 includes a catalyst which captures the oxides of nitrogen and has a predetermined maximum capacity, such as 2 g (other maximum capacities can be envisaged). Once the emissions trap 160 reaches its maximum capacity, it is not capable of capturing further oxides of nitrogen, which then pass through the emissions trap 160 and is known as slippage. A purge operation can be performed to purge or remove the captured oxides of nitrogen e.g. $NO_x$ from the emissions trap 160. Hereinafter the emissions trap 160 will be referred to as the LNT 160 for clarity. During the purge operation, slippage is caused i.e. oxides of nitrogen are released from the emissions trap 160 into the exhaust system 190. The released oxides of nitrogen may be captured or treated downstream of the emissions trap 160 as will be explained.

The emissions reduction system 180 is a reductant-based system where a reductant, often a liquid reductant, is introduced into a catalyst of the emissions reduction system 180. The emissions reduction system may be a selective catalytic reduction (SCR) system 180 associated with the exhaust system 190 of the vehicle 200. The reductant may be a urea or ammonia-based reductant. The emissions trap 160 is often located upstream (closer to the ICE) than the SCR system 180 within the exhaust 190. Due to the emissions trap 160 and the SCR 180 having different operating characteristics e.g. different effective operating temperatures, the emissions trap 160 and SCR 180 act in combination to reduce nitrogen emissions from the vehicle 200. For example, the SCR 180 may need to reach an operating temperature of around 250° C. for efficient operation, whereas the LNT 160 may be operational at a light-off or operating temperature. The operating temperature may be at least 130° C. or around 150° C. with it being appreciated that other operating temperatures for the LNT 160 may be utilised, such as depending on a chemistry of the catalyst of the LNT 160. Thus, during initial operation of the ICE, i.e. during an initial phase of a driving cycle of the vehicle 200, the LNT 160 may capture oxides of nitrogen before the SCR 180 reaches its effective operating temperature. Thus, the LNT 160 is not suitable for continuous use to capture the oxides of nitrogen, due to having a finite capacity, but is instead use to capture the oxides of nitrogen during a period of time when the SCR 180 is not operational, or is sub-optimally operational.

Figure 3:
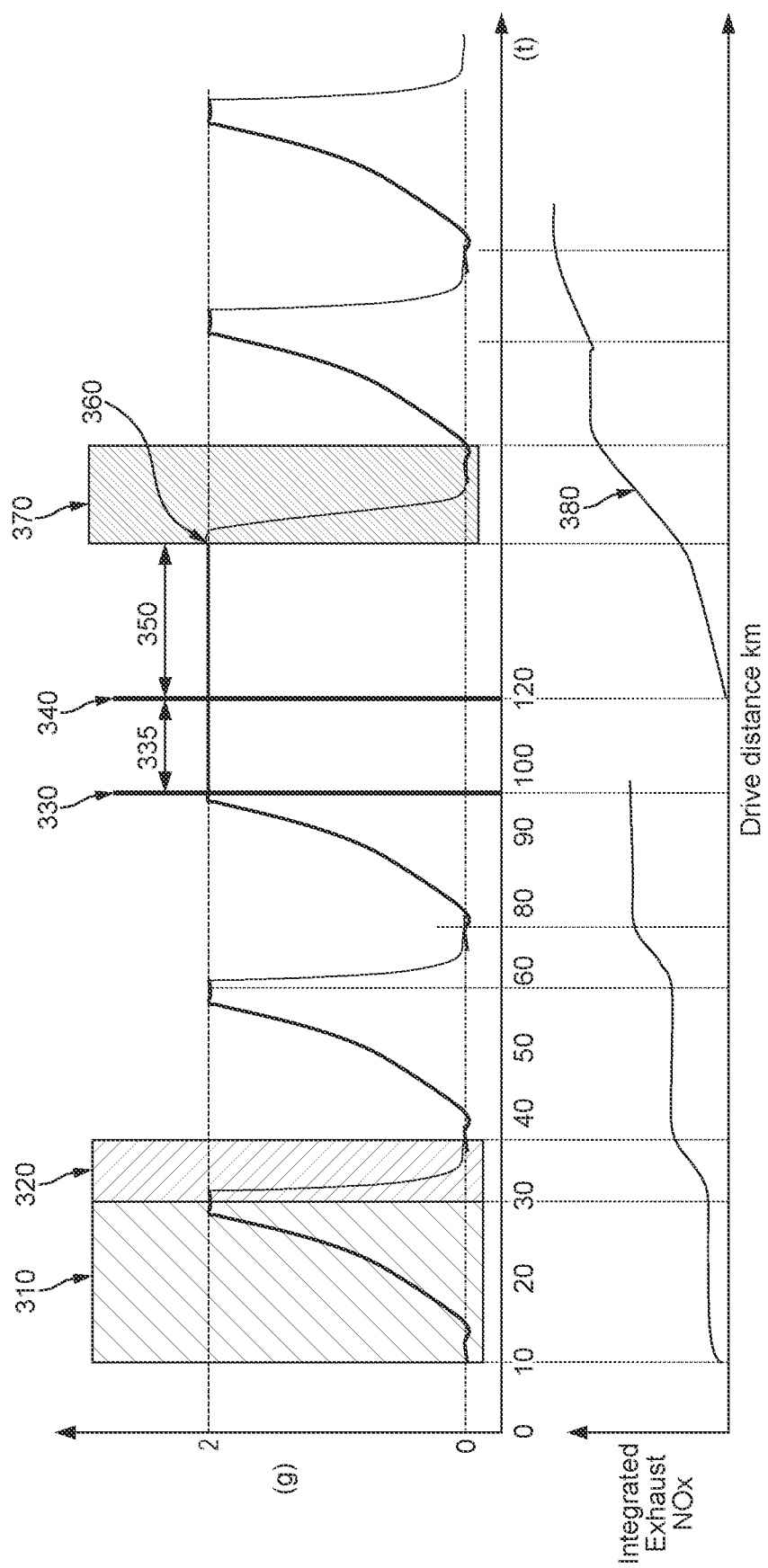
FIG. 3 illustrates load level in an emissions trap of the prior art.

FIG. 3 illustrates a load of the LNT 160 over time during use of the vehicle 200. In particular, FIG. 3 illustrates the load of the LNT 160 during first and second driving cycles of the vehicle 200. FIG. 3 indicates the load (in grams of nitrogen oxide) of the LNT 160 between 0 and a predetermined maximum, which is 2 g of $NO_x$ in the example with it being appreciated that this is not limiting. As can be observed, during a loading or use phase 310, the LNT 160 adsorbs $NO_x$ and the load of the LNT 160 increases to the maximum load. As can be appreciated from the lower portion of FIG. 3, during the loading phase 310, exhaust emissions of $NO_x$ do not substantially increase i.e. the $NO_x$ in the ICE emissions is substantially adsorbed by the LNT 160 preventing $NO_x$ emission from the exhaust 190. In the example, shortly around or immediately after reaching the maximum load and saturating, a purge phase 320 of the LNT 160 is initiated which unloads the $NO_x$ adsorbed in the LNT 160, as can be appreciated. In other words, as can be appreciated from the lower portion of FIG. 3, $NO_x$ slippage from the LNT 160 is intentionally caused, such as by heating the LNT 160, during the purge phase 320 to unload the LNT 160. The purge phase 320 is normally conducted when the SCR 180 is operative, such that oxides of nitrogen unloaded from the LNT 160 are converted at the SCR 180, rather than being emitted from the exhaust system 190 of the vehicle 200. The lower portion of FIG. 3 illustrates $NO_x$ emissions during the purge phase 320 showing the LNT 160 slippage during the unloading or purge phase 320.

FIG. 3 illustrates a number of loading and unloading phases of the LNT 160. An end of driving cycle (EoDC) event 330 is also illustrated in FIG. 3. The EoDC 330 is often triggered by a key-off or shutdown command at the vehicle 200 which ceases combustion at the ICE. For example, the EoDC 330 occurs when the vehicle 200 is stopped i.e. parked. A load of the LNT 160 is maintained i.e. is static after the EoDC 330 whilst the ICE is non-operational.

After a period of time, a next driving cycle (NDC) event 340 occurs where the ICE begins combustion. Although usually triggered by a key-on event or start-up command at the vehicle i.e. from a driver of the vehicle 200, the NDC 340 event may be instructed remotely e.g. from a mobile device of the driver, or in response to a timer set by a user of the vehicle e.g. to being pre-heating of the vehicle 200 before use to make a journey. Often, a period of time 335 elapses between the EoDC and NDC events 330, 340 such that the aftertreatment apparatus associated with the exhaust system 190 e.g. LNT 160 and SCR 180 have substantially cooled to ambient temperature or have at least dropped in temperature from their respective operating temperatures. Therefore, after the NDC event 340, a period of time 350 for heating of the LNT 160 occurs before the LNT 160 reaches its operating temperature and a purge temperature of the LNT 160 at time indicated as 360 before the purge operation 370 can begin. The purge temperature or $NO_x$ unloading temperature is a temperature at which the LNT 160 unloading can be performed with appropriate control of oxygen in the exhaust of the vehicle, as described below. Typically, the purge temperature of the LNT 160 is around 220° C., although other temperatures can be utilised. Therefore, the purge temperature is greater than the operating temperature of the LNT 160 thus a period of time is required to firstly reach the operating temperature, then the purge temperature of the LNT 160.

In the example of FIG. 3, the LNT 160 reaches saturation substantially at the same time as the EoDC event 330. It will be appreciated that this is merely an example and that in other scenarios the LNT 160 may reach saturation prior to the EoDC event 330, without being purged, or after the NDC event 340 prior to the SCR 180 reaching an effective operating temperature i.e. during period 350. In the example, the LNT 160 is not able to be purged prior to the EoDC 330 event and thus is generally fully loaded the around a time of the EoDC event 330. After the NDC event 340, as described above, it is necessary for the LNT 160 to reach the operating temperature and the purge temperature before it can be purged, during which time $NO_x$ slippage from the LNT 160 occurs as the LNT 160 is substantially full, as illustrated in the lower portion of FIG. 3, and during this period of time the SCR 180 may not effectively convert $NO_x$ from the LNT 160. Even once the LNT 160 has reached the light-off temperature, due to being saturated or to reaching saturation prior to the SCR 180 being effective, a purge operation 370 of the LNT 160 is required to be performed as illustrated by purge phase 370 during which $NO_x$ may not effectively be converted by the SCR 180, as illustrated in the lower portion of FIG. 3. Thus, it can be appreciated that slippage from an emissions trap 160 of the vehicle 200 early in a driving cycle of the vehicle 200 may be problematic.

Returning to FIG. 1, the control system 110 may be formed by one or more controller 110 which comprises processing means 120 and memory means 130. The processing means 120 may be one or more electronic processing devices 120 or processors 120 which operably execute computer-readable instructions. The memory means 130 may be one or more memory devices 130. The memory means 130 is electrically coupled to the processing means 120. The memory means 130 is configured to store computer-readable instructions, and the processing means 120 is configured to access the memory means 130 and execute the instructions stored thereon.

The control system 110 further comprises an input means 140 which may be an electrical input to receive an electrical signal 175. The control system 110 may comprise an output means 150 which may be an electrical output 150 for outputting a control signal 165 under control of the processor 120. In some embodiments, the input 140 is arranged to receive an LNT load signal 175 indicative of a load of the LNT 160 i.e. indicative of an amount of $NO_x$ adsorbed in the LNT 160. The LNT load signal 175 may be provided by a device 170 associated with the LNT 160 which may be arranged to measure the $NO_x$ load thereof. The device 170 may be a $NO_x$ sensor 170. In some embodiments, the NOx sensor 170 may comprise a plurality of $NO_x$ sensors 170. A first $NO_x$ sensor may be arranged to measure $NO_x$ emitted from the ICE upstream of the LNT 160 and a second $NO_x$ sensor may be arranged to measure $NO_x$ downstream of the LNT 160. The processor 120 may be arranged to determine the $NO_x$ load on the signals from the first and second $NO_x$ sensors. In one embodiment, the processor 120 may be arranged to determine integration of an output of the first $NO_x$ sensor minus an integration of an output of the second $NO_x$ sensor to determine the $NO_x$ load of the LNT 160. In other embodiments, the processor 120 may infer the load of the LNT 160 without direct measurement, such as from data indicative of an output of oxides of nitrogen, such as $NO_x$, by the ICE according to a load on the ICE.

The processor 120 is arranged to control the output 150 to output the control signal 165 which may be a purge signal 165 for initiating or controlling a purge operation of the LNT 160. FIG. 1 illustrates the purge signal 165 being provided to the LNT 160, with it being appreciated that this is for ease of explanation. The purge signal 165 may be provided to a controller associated with the LNT 160 which is arranged to control the purge operation of the LNT 160, such by controlling a rich lambda (i.e. <1) operation of the ICE, as will be appreciated. The purge operation may be performed when an exhaust temperature of the vehicle 200 is relatively hot i.e. above a predetermined purge temperature, such that the higher temperature provides a higher activation energy for a chemical reaction required to unload the catalyst of the LNT of oxides of nitrogen. The high temperature also reduces a period of time required for the purge operation, thereby reducing emissions caused during the purge operation such as hydrocarbon (HC), carbon monoxide (CO) and particulate emissions (PM) particularly from the rich lambda operation.

The processor 120 is arranged to determine a prediction of the EoDC 330 of the vehicle 200. That is, during a current driving cycle of the vehicle 200 the processor 120 is arranged to predict when the current driving cycle is likely to end. The processor 120 is arranged to determine a likelihood of slippage from the LNT 160 in a next driving cycle of the vehicle 200, as will be explained, in dependence on the prediction of the EoDC 330. The processor 120 is arranged to control purging of the LNT 160 prior to the prediction of the EoDC 330 in dependence on the likelihood of slippage.

Figure 4:
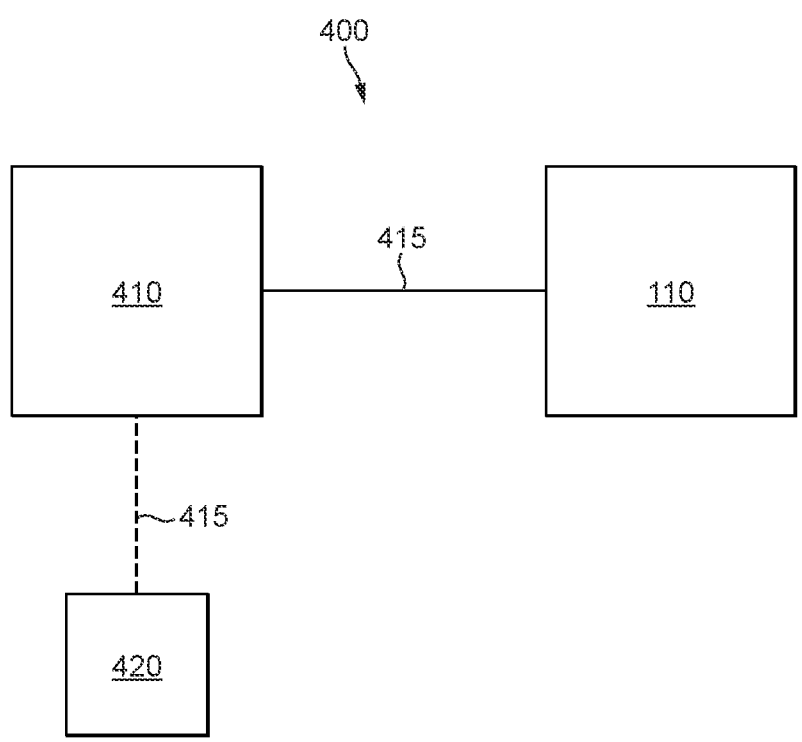
FIG. 4 shows a system according to an embodiment of the present invention.

FIG. 4 illustrates a system 400 comprising the controller 110 shown in FIG. 1. It will be appreciated that other components, such as the LNT 160 are omitted from FIG. 4 for clarity. The controller 110 is communicably coupled to a navigation system 410 associated with the vehicle 200. The controller 110 and navigation system 410 are communicably coupled by an interface 415 of the vehicle 200 which may be a network 415 adhering to a relevant communications protocol such as a CAN Bus network, with other protocols including CANFD, Flexray, Ethernet and SENT networks for example.

The navigation system 410 may have been provided with an indication of an intended destination of the vehicle e.g. by the driver providing an input indicative of an address or a point of interest (POI) to which the driver intends to travel.

The input may be provided as a selection on a graphical user interface of the navigation system 410 or as an audible input, for example.

The navigation system 410 may be arranged to infer the destination of the vehicle 200. The intended destination of the vehicle 200 may be inferred based on data indicative of regular routes or journeys undertaken by the vehicle 200 which is stored accessible to the navigation system 410.

For example, the location of the vehicle 200 and/or the time of day may be indicative of the intended destination. For example, if the vehicle 200 is parked at a place of work and a journey of the vehicle begins at a time generally corresponding to a regular commute home, the vehicle 200 location and time are strongly suggestive intended destination. In some embodiments, an identity of the driver of the vehicle 200 may be utilised in the inference of the intended destination. The identity of the driver of the vehicle 200 may be inferred in dependence on an identity of an electronic device associated or carried by the driver, such as an electronic key for accessing the vehicle 200, or other indications such as provided from a facial recognition system associated with the vehicle 200. Other sources of information indicative of the identity of the driver may be envisaged.

In some embodiments, the navigation system 410 is communicably coupled, such as over a wired or wired communication channel 415, e.g. Bluetooth, with a portable electronic device 420 associated with a user of the vehicle 200, such as the driver of the vehicle. The portable electronic device 420 may be a portable computing device, such as a tablet, or a portable communications device such as a mobile telephone or smartphone 420. Although FIG. 4 shows the navigation system 410 being directly coupled to the device 420 it will be realised that the coupling may be indirect via one or other devices or links associated with the vehicle. The device 420 and the navigation system 410 may communicate such that the navigation system 410 is provided with an indication of the identity of the driver from the device 420 on which the inference of the destination of the vehicle 200 can be based. The device 420 may alternatively provide an indication of the destination of the vehicle 200 to the navigation system. For example, the driver may select the destination using software executing on the device 420 e.g. navigation software executing on the device 420 which provides the indication to the navigation system 410. In dependence on the destination of the vehicle 200, the controller 110 may determine the prediction of the EoDC 330 of the vehicle.

In some embodiments, based on the destination of the vehicle 200, either explicitly identified by the driver or inferred by the navigation system 410, the navigation system 410 may determine a prediction of a period of time for which the vehicle 200 will be operational or travelling before reaching the destination, or a route to be followed by the vehicle 200 to the destination.

Based on the destination of the vehicle 200, in some embodiments on the predicted operational period or route, a loading of the LNT 160 during the current driving cycle i.e. before the EoDC 330 may be determined by the processor 120.

The prediction of the loading of the LNT 160 may be determined in dependence on an e-horizon system associated with the vehicle. The e-horizon system associated with the vehicle may be associated with the navigation system 410. The e-horizon system may provide data indicative of gradients or elevations associated with map data, such that an indication of torque demand from the ICE for the vehicle 200 to travel the route to the destination may be determined or estimated. In this way, emissions from the ICE may be estimated for the route. The loading of the LNT 160 for the route may be determined in dependence on data from the e-horizon system. The predicted loading of the LNT 160 may be determined in dependence on the identity of the driver in some embodiments. It is expected that each driver of the vehicle has an associated driving style, with an associated emissions load. For example, one driver may be relatively economical whereas another driver may have a more purposeful driving style, each exhibiting a different, respective, emissions load on the vehicle 200. By storing data indicative of the driving style or emissions load associated with the identity of each driver of the vehicle 200, the $NO_x$ output associated with the identified driver may be used to determine the loading of the LNT 160 for the current driving cycle in dependence on the predicted EoDC 330.

Operation of the system 100, 400 according to embodiments of the invention will now be described with reference to FIGS. 5-7.

Figure 5:
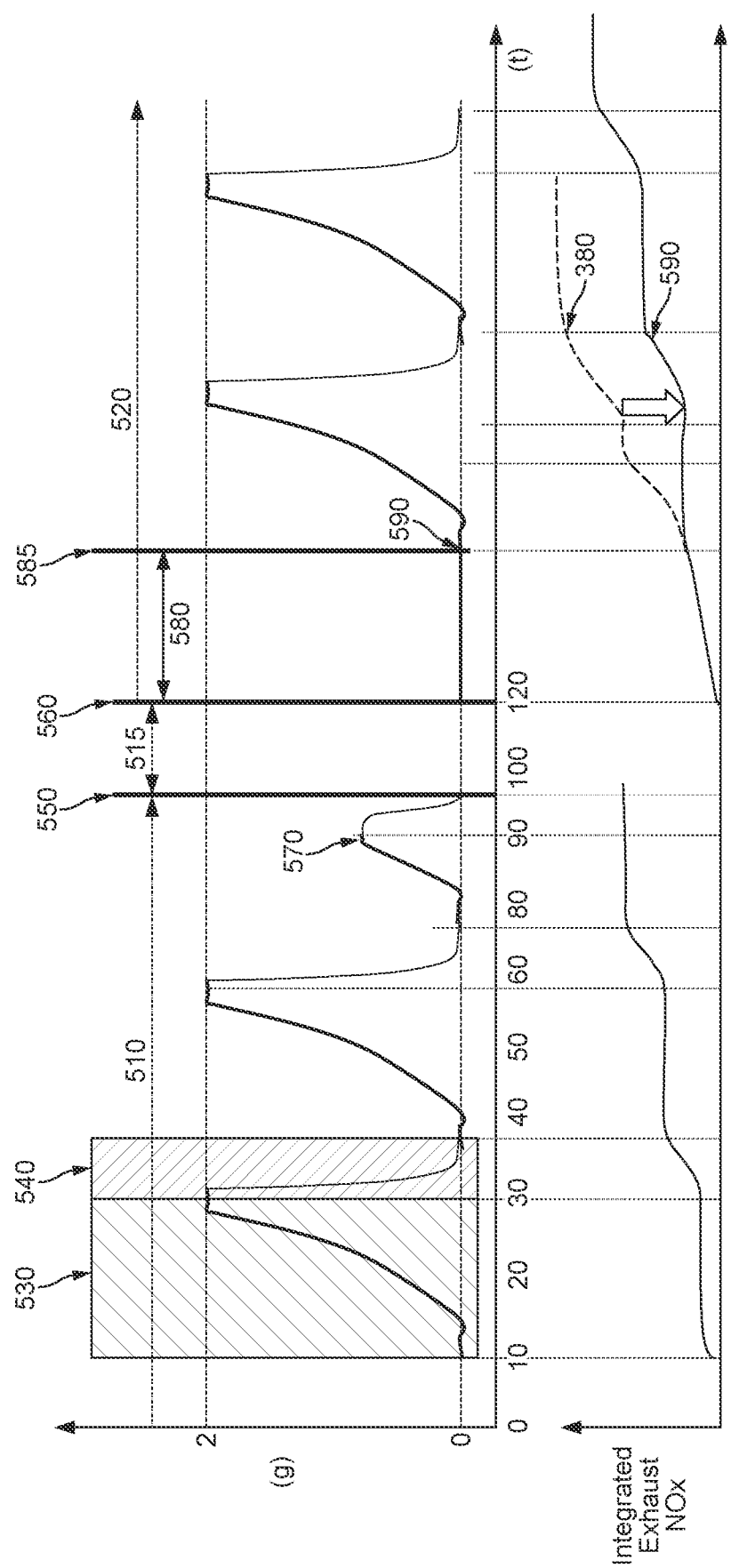
FIG. 5 illustrates load in an emissions trap according to an embodiment of the present invention.

FIG. 5 illustrates loading of the LNT 160 in an example according to an embodiment of the present invention. In the example illustrated in FIG. 5, two driving cycles 510, 520 are shown in the period of time covered by FIG. 5. A first driving cycle 510 is referred to as a current driving cycle 510 of the vehicle 200. It will be appreciated that the first driving cycle 510 is not fully shown in FIG. 5 i.e. only an end portion of the first driving cycle is shown. A second driving cycle 520 is referred to as a next driving cycle 520. The current and next driving cycles 510, 520 are separated by a period of time 515 for which the vehicle 200 is not operation i.e. is parked with the ICE non-operational. As explained above with reference to FIG. 3, during the current driving cycle 510 the emissions trap in the form of the LNT 160 of the vehicle 200 adsorbs oxides of nitrogen such as $NO_x$ in a loading or use phase 530. The LNT 160 may adsorb $NO_x$ in the loading phase 530 until the LNT 160 reaches a maximum load which in the example is 2 g with it being appreciated that this is merely an example maximum load figure. After reaching the maximum load and saturating, a purge phase 540 of the LNT 160 is initiated which unloads the $NO_x$ adsorbed in the LNT 160. In normal operation i.e. at normal operating temperature, the $NO_x$ unloaded from the LNT 160 in the purge phase 540 is treated with reductant, such an ammonia or urea based reductant, in a SCR system of the vehicle 200. In the example of FIG. 5 in the current driving cycle 510 the LNT 160 is loaded 530 to reach maximum $NO_x$ load and is subsequently purged 540 twice.

Figure 6:
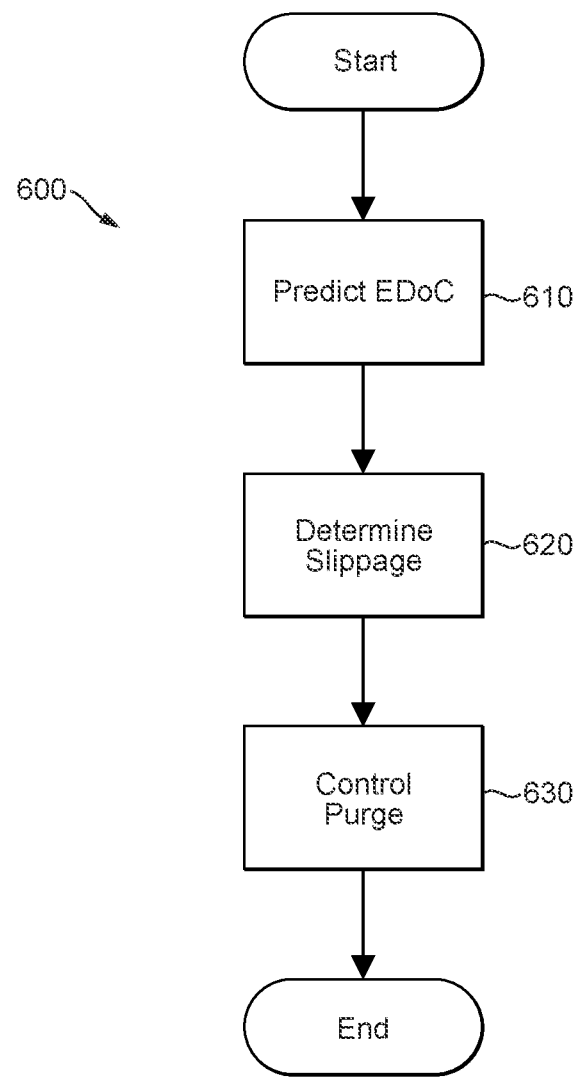
FIG. 6 shows a method according to an embodiment of the present invention.

FIG. 6 illustrates a method 600 according to an embodiment of the invention. The method 600 is a method for controlling purging of an emissions trap, such as the LNT 160, of the vehicle 200. FIG. 7 illustrates a further method 700 according to an embodiment of the invention which may be performed in a step of the method 600 illustrated in FIG. 6 in some embodiments. The methods 600, 700 may be performed by the system 100 shown in FIG. 1.

In block 610 of the method 600, the processor 120 is arranged to determine a prediction of an end of a current driving cycle (EoDC) 550 of the vehicle 200. The prediction of the end of the current driving cycle is an indication of when operation of the ICE of the vehicle 200 will end. The EoDC 550 is illustrated in FIG. 5 which finishes or terminates the current driving cycle 510. The prediction of the EoDC 550 enables a predicted loading of the LNT 160 at the end of the current driving cycle 510 to be determined in dependence thereon. In some embodiments, as described above, an indication associated with the prediction of the EoDC 550 may be received from a navigation system 410 of the vehicle. The prediction of the EoDC 550 may comprise one or more of an indication of a duration of time remaining to the EoDC 550, a distance of travel of the vehicle 200 until the EoDC 550, or a load of one or more oxides of nitrogen such as $NO_x$ which are predicted to be emitted by the ICE until the EoDC 550, as described above.

In block 620 a likelihood of slippage from the LNT 160 the next driving cycle 520 is determined. The likelihood is determined in dependence on the prediction of the EoDC 550. By slippage, it is mean that the adsorption of $NO_x$ by the LNT 160 is reduced i.e. that more than a predetermined proportion $NO_x$ of in the exhaust system 190 of the vehicle 200 escapes the LNT 160. In some embodiments, the determining the likelihood of slippage from the LNT 160 in the next driving cycle 520 comprises receiving a signal 175 indicative of a current capacity of the LNT 160. The controller 110 may receive the LNT load signal 175 indicative of the current load of the LNT 160 at a time during the current driving cycle 510. Based on the current load of the LNT 160 in the current driving cycle 150, a prediction of a remaining capacity of the LNT 160 at the predicted EoDC 550 may be determined in block 620. If the remaining capacity at the EoDC 550 is relatively low, such as below a predetermined minimum threshold capacity, the controller may initiate a purge of the LNT 160 in block 630, as will be explained. The predetermined remaining minimum threshold capacity may be, for example, 25%, 15% or 10% of the total $NO_x$ capacity of the LNT 160. For example 25% of the total capacity may be 0.5 g of $NO_x$ at the EoDC 550. If the predicted remaining capacity of the LNT 160 at the EoDC 550 is equal to or below the minimum threshold capacity, a pre-emptive purge 570 of the LNT 160 may be initiated in block 630, as illustrated in FIG. 5. Otherwise, if the predicted remaining capacity of the LNT 160 is greater than the minimum threshold capacity, no specific action may be performed i.e. purging of the LNT 160 may be performed in block 630 in dependence on the LNT 160 reaching its maximum capacity as in normal operation illustrated in 530, 540.

Where the LNT 160 is to be pre-emptively purged in block 630, the controller 110 is arranged to output the purge signal 165 to initiate the purge operation of the LNT 160. The pre-emptive purge operation 570 is performed when the LNT 160 is below a maximum capacity of the LNT 160 i.e. it is not substantially full storing $NO_x$. The pre-emptive purge is performed sufficiently in advance of the predicted EoDC 550 to complete before the EoDC 550 occurs. Thus at the EoDC 550 the LNT 160 will be relatively empty. In some embodiments, the controller 110 is arranged to initiate the purge of the LNT 160 to complete the purge operation 570 just in time before the EoDC 550 as illustrated in FIG. 5. The LNT 160 is pre-emptively purged in order to ensure sufficient capacity to store oxides of nitrogen in an initial period 580 of the next driving cycle 520. In particular, the pre-emptive purge of the LNT 160 is performed to ensure that the LNT 160 will not reach maximum capacity in the next driving cycle before the SCR 180 is able to process oxides of nitrogen, as will be explained with reference to FIG. 8. Thus, during the initial period 580 of the next driving cycle, the catalyst of the LNT 160 is heated to reach a light-off temperature for processing $NO_x$ at time 585. As indicated by arrow 590, when the catalyst reaches the light-off temperature at 585, the LNT 160 is at a relatively low capacity, such as close to zero in the example of FIG. 5, and is thus able to adsorb $NO_x$. The lower portion of FIG. 5 compares integrated $NO_x$ emissions of the prior art 590 from FIG. 3, and integrated $NO_x$ emissions according to an embodiment of the invention. As can be appreciated, in comparison to a need to perform a purge of the LNT 160 relatively early in the next driving cycle 510, embodiments of the invention are able to adsorb $NO_x$ once the catalyst of the LNT 160 reaches the operating temperature at time 585 without requiring to be purged.

Figure 7:
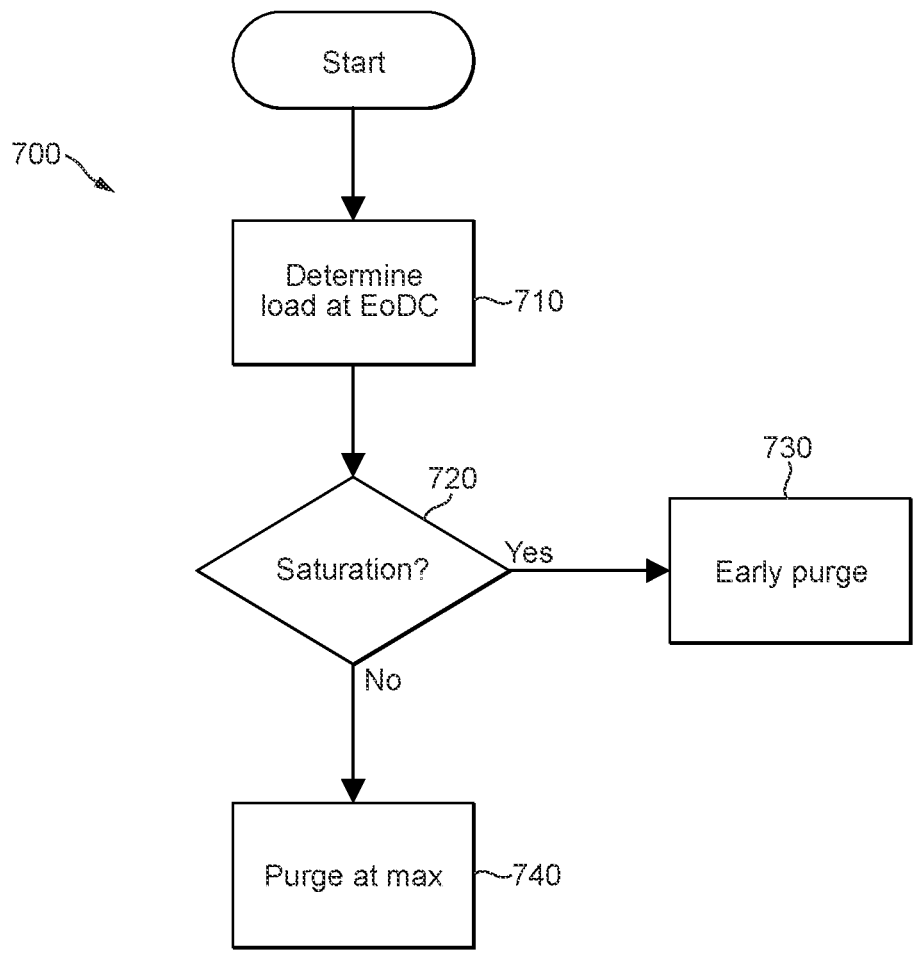
FIG. 7 shows a further method according to an embodiment of the present invention.

The method 700 of FIG. 7 may be performed in block 620 of the method 600 shown in FIG. 6. The method 700 is a method of determining whether slippage of the LNT 160 is likely to occur in the next driving cycle 520 of the vehicle 200. In some embodiments, the determination in block 620 of the likelihood of slippage from the LNT 160 in the next driving cycle 520 vehicle comprises determining an estimate of an ability of the emissions trap to capture emissions in the next driving cycle 520 prior to an emission reduction system, such as the SCR, being operational.

Block 710 comprises determining a prediction of the load of the LNT 160 at the EoDC 550. As noted above, the prediction of the load of the LNT 160 may be based on the current load and an estimated load prior to the EoDC 550.

Figure 8:
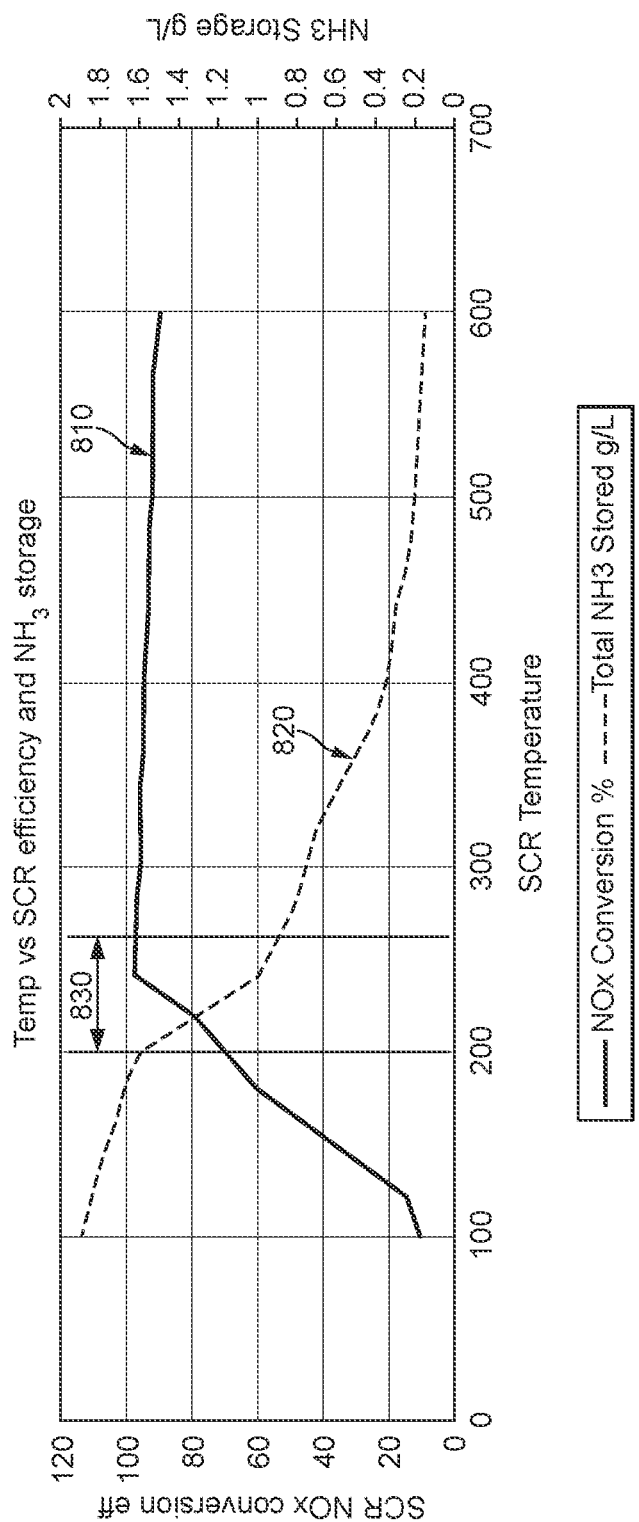
FIG. 8 illustrates efficiency and storage capacity against temperature of an emissions reduction system.

Block 720 comprises determining whether saturation or maximum loading of the LNT 160 will occur in the next driving cycle 520. In block 720, it may be determined whether the LNT 160 is likely to reach its maximum load before the emission reduction system is operational i.e. before the SCR 180 is ready to treat nitrogen oxide emissions such as $NO_x$. In some embodiments, the SCR 180 being operational comprises an operating temperature of the SCR 180 meeting one or more predetermined criteria. FIG. 8 illustrates SCR temperature against $NO_x$ conversion efficiency 810 and ammonia ($NH_3$) storage 820 in g/L of reductant. As an be appreciated, as temperature increases the conversion efficiency increases to a maximum, whilst the storage in g/L of $NO_x$ deceases. Thus the SCR 180 has an effective temperature operating window 830 as illustrated. Therefore, the predetermined criteria may comprise a minimum operating temperature and/or a maximum operating temperature for effective operation. In some embodiments, the one or more criteria comprise the operating temperature of the SCR 180 being at least 150° C. or at least 200° C. In some embodiments, one or more criteria comprise the operating temperature of the SCR 180 being less than 300° C. or less than 275° C. If, in block 720, it is determined that the LNT 160 will reach saturation or maximum storage capacity before the temperature of the SCR 180 meets the one or more criteria in the next driving cycle 520, the method 700 may move to block 730 where the LNT 160 is pre-emptively purged in the current driving cycle 510. Alternatively, the method 700 moves to block 740 where normal operation of purging of the LNT 160 is continued i.e. the LNT 160 is purged generally when it reaches maximum storage capacity.

It can therefore be appreciated that embodiments of the invention reduce emissions, particularly of oxides of nitrogen, early in a driving cycle of a vehicle.

Another embodiment according to the present invention will now be described with reference to FIGS. 8 to 13.

FIG. 8 illustrates temperature against an operating efficiency 810 and an ammonia storage capacity 820 of the SCR 180. The operating efficiency 810 is a conversion efficiency of converting $NO_x$ emissions from the ICE to harmless nitrogen ($N_2$) and water ($H_2O$) using the stored ammonia. The operating efficiency is determined in dependence on the conversion efficiency which is an efficiency of converting $NO_x$ to $N_2$ which may be defined as a percentage as in FIG. 8. The operating efficiency is determined in dependence on an ammonia storage capacity 820 which is defined as a storage capacity of ammonia ($NH_3$) per unit volume of reductant, which in the example of FIG. 8 is in units of g of $NH_3$ per litre (g/L) of catalyst volume. For example, where 2 g of $NH_3$ is stored by a catalyst of 1l volume. Thus the operating efficiency of the SCR 180 is a function of the conversion efficiency and ammonia storage capacity. As can be appreciated from FIG. 8, the operating efficiency of the SCR 180 at low temperatures is dominated by the increasing conversion efficiency and increases with temperature, up to a threshold temperature at which the conversion efficiency substantially reaches a maximum, which may be above 90%, such as up to around 96% as in the example, above which temperature the conversion efficiency may actually decrease slightly with increasing temperature. The threshold temperature may be a temperature associated with the exhaust system 190 such as an operating temperature of the SCR 180 being at least 150° C. or at least 200° C.

It will also be appreciated that the efficiency of the SCR 180 may be determined, in addition to temperature, on one or more of a current NH3 load in the catalyst, a mass flow rate of exhaust gas through the SCR and an age of the SCR 180.

Meanwhile, the ammonia storage capacity of the SCR 180 reductant is observed to reduce with increasing temperature. Therefore, as can be appreciated from FIG. 8, a peak operating efficiency window 830 of temperature exists for the SCR 180 between first and second temperatures which balances increasing conversion efficiency of the SCR 180 with reducing storage capacity of the reductant. An upper temperature threshold of the operating efficiency window may be less than 300° C. or Less than 275° C.

Figure 9:
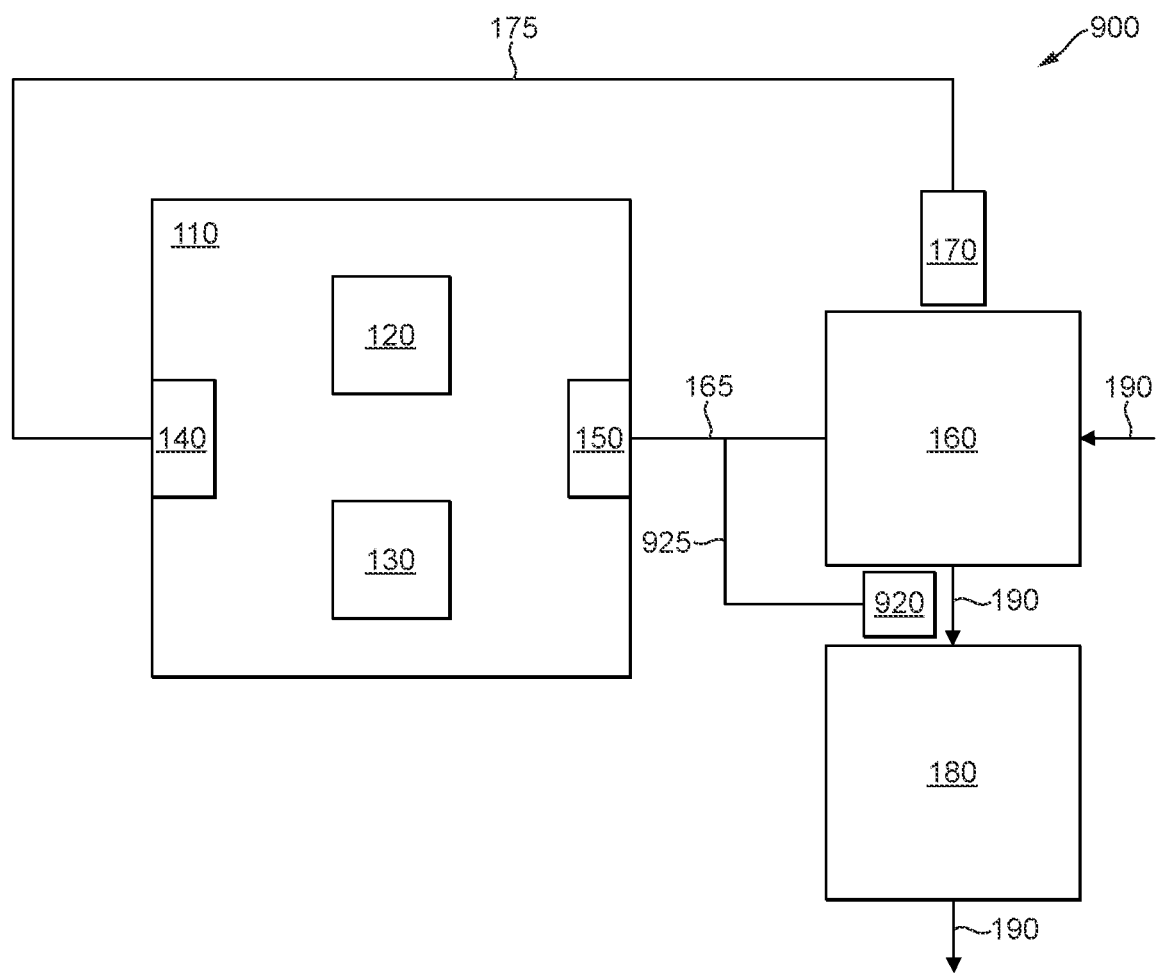
FIG. 9 illustrates another system according to an embodiment of the invention.

FIG. 9 illustrates a system 900 according to another embodiment of the invention. The system 900 comprises some like parts to the system 100 described with reference to FIG. 1. Said like parts share common reference numerals and the reader is directed to the description above which is not repeated here for clarity. The system 900 further comprises a temperature sensing means 920 which may be a temperature sensing device 920. The temperature sensing device 920 is associated with the exhaust system 190 of the vehicle 200 for sensing an operating temperature associated with the exhaust system 190. The operating temperature may be a temperature of the exhaust system proximal to one or both of the LNT 160 and the SCR 180. In some embodiments, the LNT 160 and the SCR 180 are proximal in the exhaust system 190 such that both are at substantially the same temperature. However, in other embodiments, each of the LNT 160 and SCR 180 are associated with a respective temperature sensing device. The, or each, temperature sensing device 920 is arranged to output a temperature signal 925 indicative of the sensed temperature associated with the exhaust system 190. The temperature signal 925 is received at the input 150 of the control unit 110. As will be explained, the control unit 110 is arranged to determine one or both of an efficiency of purging the LNT 160 and an operating efficiency of the SCR 180 in dependence on the temperature signal 925.

As will be explained, embodiments of the invention are arranged to determine a schedule for purging of the LNT 160 in dependence on the efficiency of purging the LNT 160 and the operating efficiency of the SCR 180. A purge operation of the LNT 160 is performed according to the determined schedule.

Figure 10:
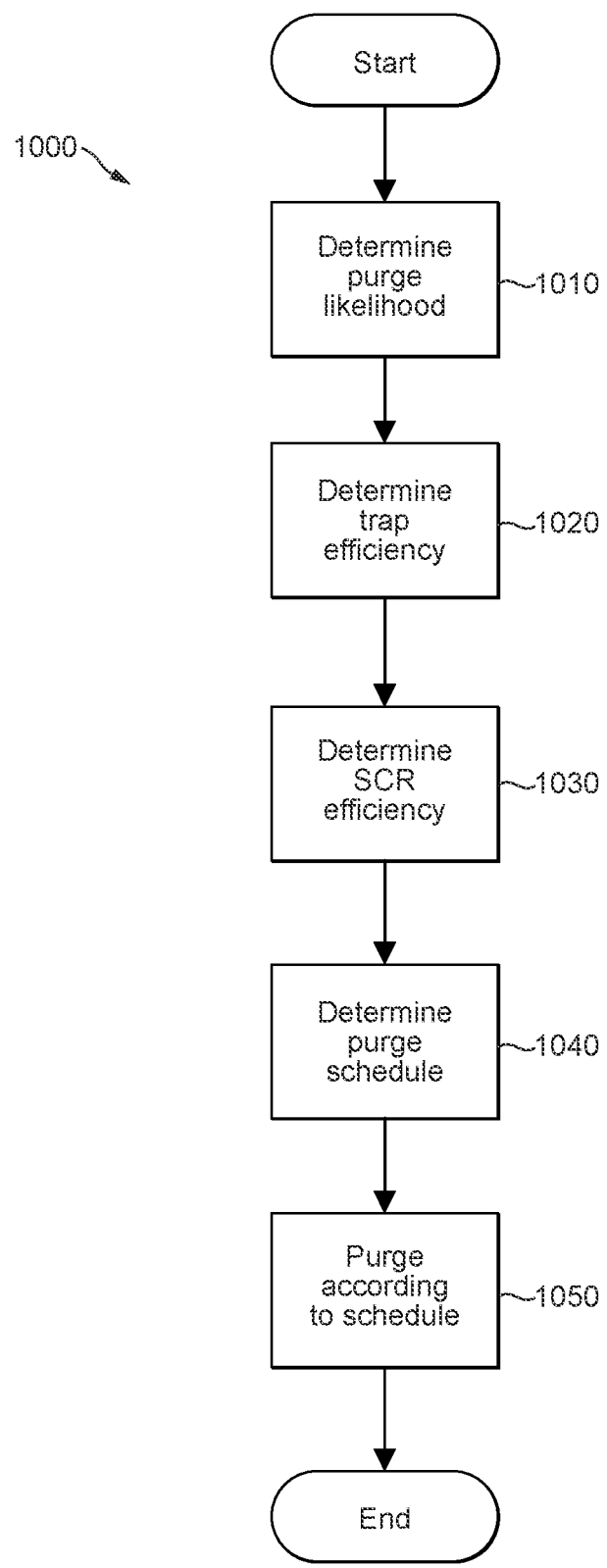
FIG. 10 illustrates a further method according to an embodiment of the invention.
Figure 11:
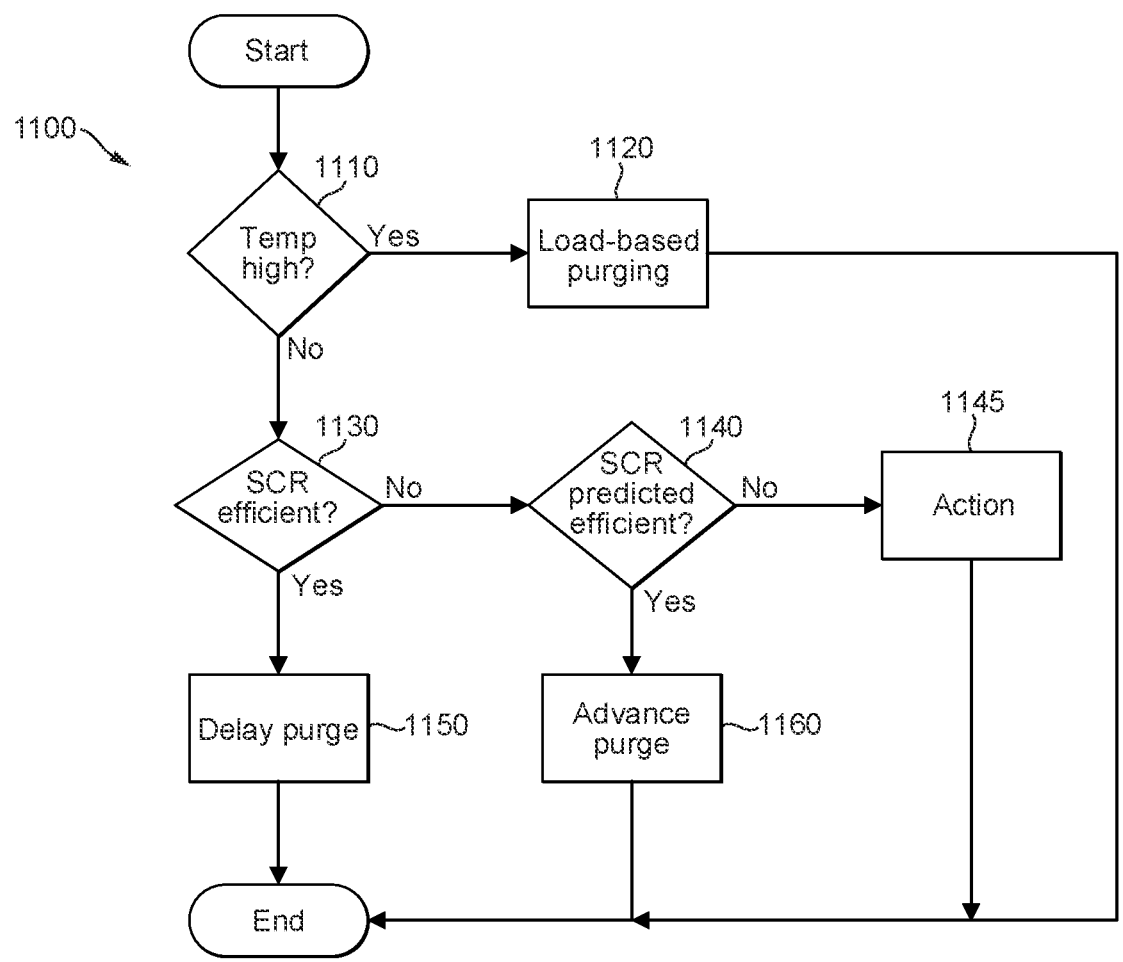
FIG. 11 illustrates a still further method according to an embodiment of the invention.

FIG. 10 illustrates a method 1000 according to an embodiment of the invention. The method 1000 is a method for controlling purging of an emissions trap, such as the LNT 160, of the vehicle 200. FIG. 11 illustrates a further method 1100 according to an embodiment of the invention which may be performed in a step of the method 1000 illustrated in FIG. 10 in some embodiments. The methods 1000, 1100 may be performed by the system 100 shown in FIG. 9.

The method 1010 comprises a block 1010 of determining a likelihood of a $NO_x$ adsorber trap of the vehicle 200 requiring purging. The $NO_x$ adsorber trap may be the LNT 160 of the vehicle 200. In some embodiments of block 1010 the likelihood of the LNT 160 requiring purging is determined in dependence on a current capacity of the LNT 160.

In some embodiments, as described above with reference to FIG. 1, the input 140 of the control system 110 is arranged to receive an LNT load signal 175 indicative of a load of the LNT 160 i.e. indicative of an amount of $NO_x$ adsorbed in the LNT 160. The LNT load signal 175 may be provided by the device 170, such as the one or more NOx sensors 170 as discussed above, associated with the LNT 160 for measuring the load thereof. In other embodiments, the processor 120 of the control system 110 may infer the load of the LNT 160 without direct measurement, such as from data indicative of an output of oxides of nitrogen, such as $NO_R$, by the ICE according to a load on the ICE. Thus, the likelihood of the LNT 160 requiring purging may be determined in block 1010. The likelihood may be a likelihood of the LNT 160 requiring purging with a predetermined period of time, which may in some embodiments be a predetermined period of operational time of the ICE i.e. which may span one or more driving cycles.

Block 1020 of the method comprises determining an efficiency of purging the $NO_x$ adsorber trap, such as the LNT 160. The efficiency of purging the LNT 160 may be determined in dependence on a duration of time required for the purge or unloading operation of the LNT 160. As noted above, during the purge operation a rich lambda (i.e. <1) operation of the ICE is performed to assist in releasing oxides of nitrogen from the catalyst of the LNT 160. The purge operation may be performed more efficiently when the exhaust temperature of the vehicle 200 is relatively high or hot for the higher temperature to provide a higher activation energy for a chemical reaction required to unload the catalyst of the LNT 160 of oxides of nitrogen. At higher temperatures, the time required for the purge operation is reduced, thereby reducing emissions caused during the purge operation such as hydrocarbon (HC), carbon monoxide (CO) and particulate matter (PM) emissions particularly from the rich lambda operation. Thus, it can be appreciated at lower temperatures the purge operation requires a longer duration of time and may increase emissions, particularly of one or more types, such as HC, CO and PM. Block 1020 may comprise determining a temperature associated with the LNT 160. The temperature may be determined in block 1020 in dependence on the temperature signal 925. The efficiency of purging the LNT 160 may be proportional to increasing temperature, or may be increased above a predetermined threshold temperature.

Block 1020 may comprise determining a current efficiency of purging the LNT 160. By current efficiency it is meant at a current point in time i.e. how efficiently the LNT 160 may be purged at the present time. Block 1020 in some embodiments may comprise determining a prediction of a future efficiency of purging the LNT 160. By determining the prediction of the future efficiency of purging the LNT 160 it is meant at a future or upcoming point in time. The prediction may be determined in dependence on a prediction of a future temperature associated with the LNT 160, such as of the exhaust system 190. As noted above, a destination of the vehicle 200 may be determined or predicted and a route to the destination determined in dependence thereon. Furthermore, in some embodiments of the invention, the e-horizon system may be used to determine a predicted torque demand from the ICE associated with the route. Based on the predictions of one or both the destination and the route, a prediction of the temperature associated with the LNT 160 may be determined in block 1020. For example, at a point in time in the future, the control system 110 may predict in block 1020 that the vehicle 200 is climbing a gradient and thus the temperature of the exhaust system will be relatively high due to torque demand from the ICE. Thus, in block 1020 it may be determined that at a future point in time it may be more efficient to purge the LNT 160 than at a current point in time, for example.

Block 1030 of the method 100 comprises determining an operating efficiency of SCR 180 of the vehicle 200. As described above in connection with FIG. 8, the operating efficiency is determined in dependence on the conversion efficiency 810 of the SCR 180 and the ammonia storage capacity 820. The operating efficiency may have a peak within a predetermined temperature window 830 defined between the first and second temperatures as described above. The operating efficiency may be determined in dependence on the temperature signal 925.

Block 1030 may comprise determining a current operating efficiency of the SCR 180. By current efficiency it is meant at a current point in time i.e. how efficiently the SCR 180 is operating at the present time.

Block 1030 in some embodiments may comprise determining a prediction of a future operating efficiency of the SCR 180. By determining the prediction of the future operating efficiency of the SCR 180 it is meant at a future or upcoming point in time. The prediction may be determined in dependence on a prediction of a future temperature associated with the exhaust system or the SCR 180. As described above in connection with block 1020, the prediction may be determined in dependence on a destination and/or a route of the vehicle and, in some embodiments, data from a e-horizon system associated with the vehicle 200 which may be used to predict a load of the ICE.

Block 1040 comprises determining a schedule for purging of the LNT 160 of the vehicle. The schedule may be determined in dependence on one or more of the likelihood of the LNT requiring purging as determined in block 1010, the efficiency of purging the LNT 160 as determined in block 1020 and the operating efficiency of the SCR 180 as determined in block 1040.

In block 1040, if it is determined that the LNT 160 will require purging within a predetermined period of time i.e. that the LNT 160 is approaching its associated $NO_x$ storage capacity, for example is at least 50% or other predetermined capacity level, then block 1040 comprises considering the efficiency of purging the LNT 160 as in block 1020. If the temperature associated with the exhaust system 190 is relatively high, block 1040 may comprise purging the LNT 160 as normal i.e. when the LNT 160 is substantially at its maximum storage capacity. Otherwise, it is necessary to consider the operating efficiency of the SCR 180 as determined in step 1030 to determine the schedule in block 1040.

Figure 13:
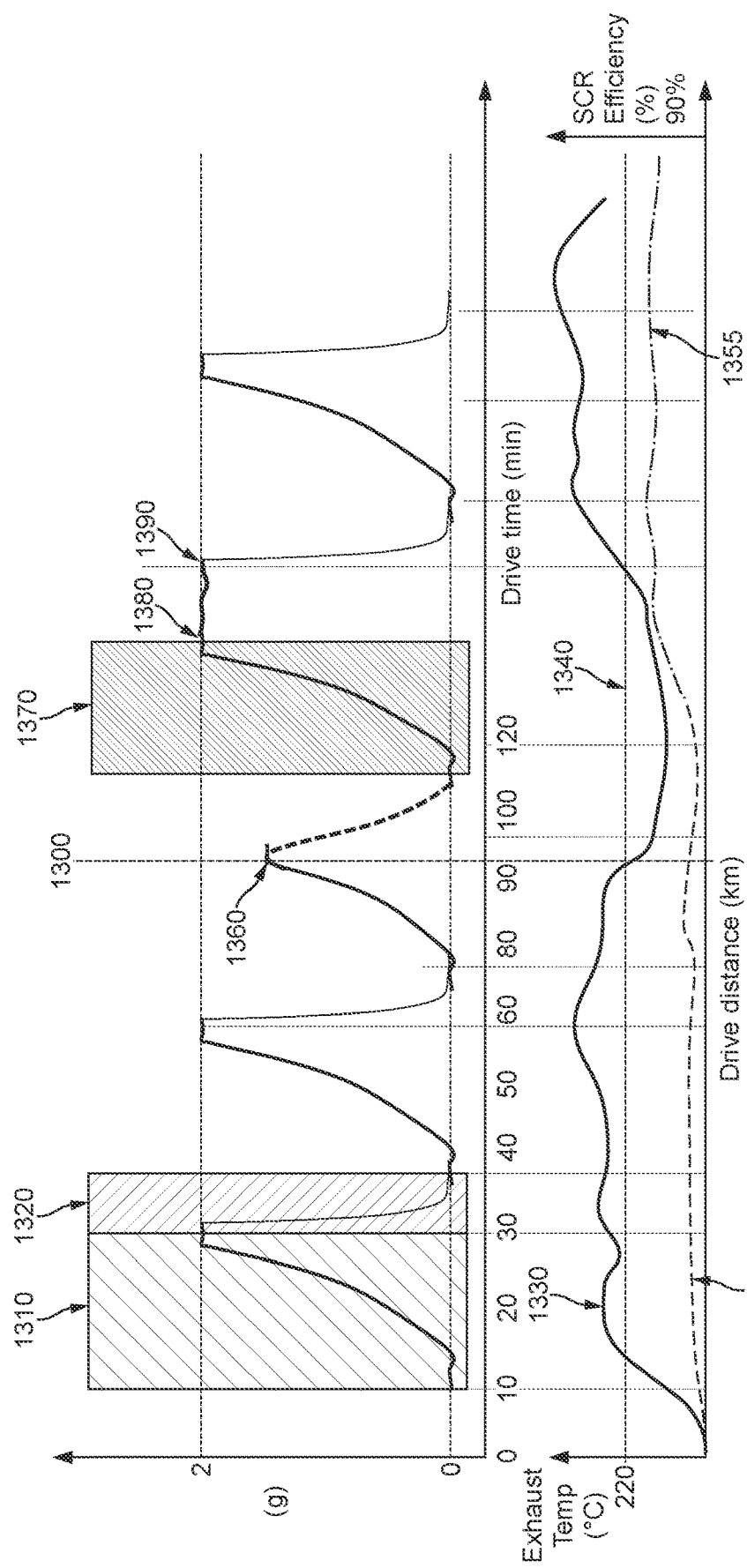
FIG. 13 illustrates load in an emissions trap and temperature according to another embodiment of the present invention.

In some embodiments, block 1040 comprises determining the schedule for purging of the LNT 160 comprising a purge of the LNT 160 prior to said LNT 160 reaching a maximum $NO_x$ storage capacity. That is, the LNT 160 maybe scheduled to be purged in advance i.e. before necessary due to almost exhausting its storage capacity for $NO_x$. FIG. 13 illustrates an advanced purge of the LNT 160 as indicated by reference numeral 1360 which will be explained further below.

Figure 12:
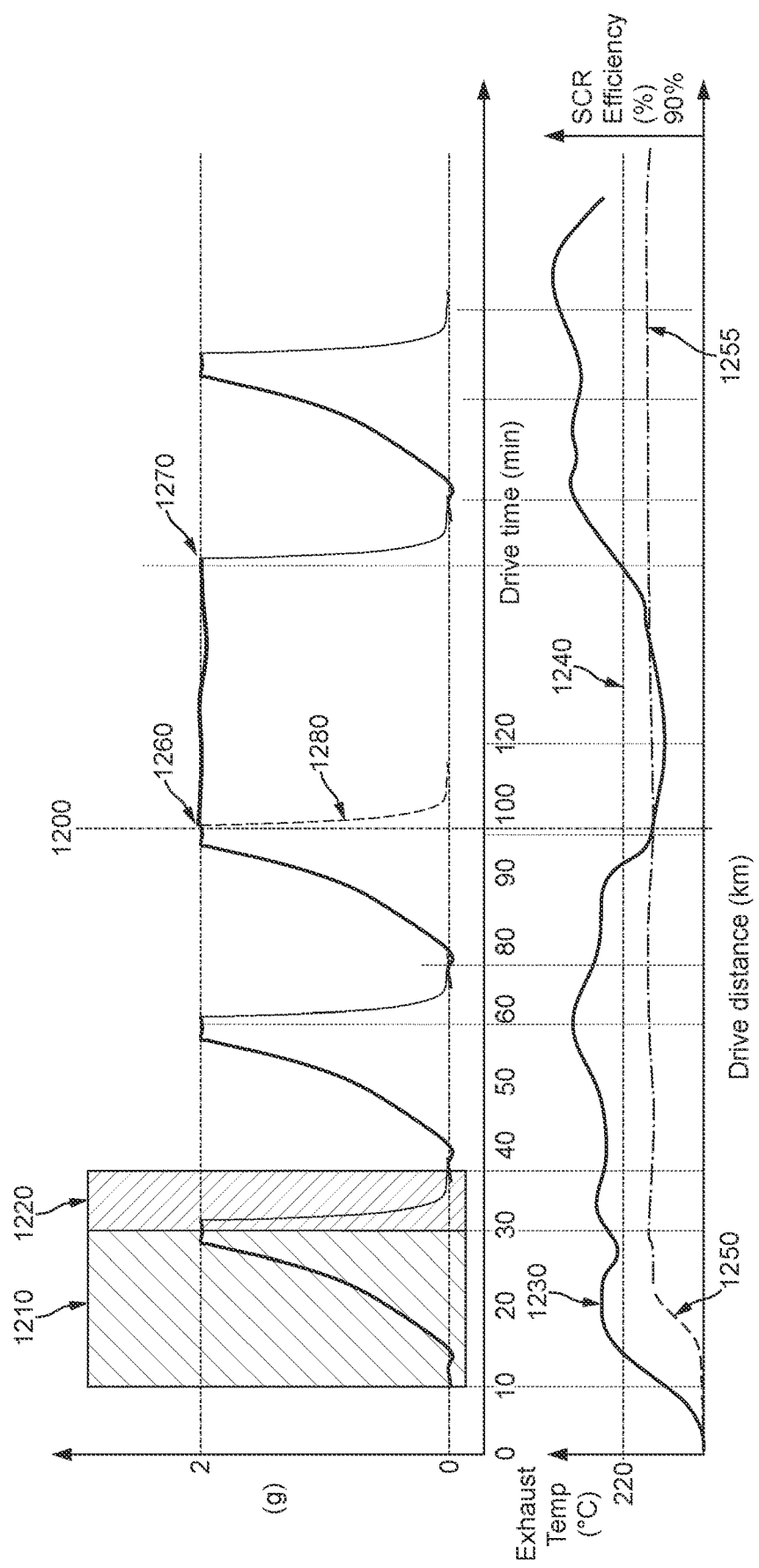
FIG. 12 illustrates load in an emissions trap and temperature according to an embodiment of the present invention.

In some embodiments, block 1040 comprises determining the schedule for purging of the LNT 160 comprising scheduling one or more future purges of the LNT 160. The scheduled future purge may comprise scheduling a delayed purge of the LNT 160. By delayed purge it is meant that the LNT 160 is allowed to reach its a maximum $NO_x$ storage capacity, but not to be purged or unloaded generally immediately. FIG. 12 illustrates a delayed purge of the LNT 160, wherein the LNT 160 reaches the maximum $NO_x$ at time indicated by reference numeral 1260, but is not immediately purged which would have resulted in unloading indicated by line 1280. Instead, the LNT 160 remains loaded for a period of time until time 1270 when the LNT 160 is purged.

Block 1050 comprises controlling purging of the LNT 160 according to the schedule determined in block 1040. In block 1050 the control system 110 is arranged to output the purge signal 165 at an appropriate point in time according to the determined schedule. In some embodiments in block 1050 the processor 120 is arranged to control the output 150 of the control system 110 to output the purge signal 165 for initiating or controlling a purge operation of the LNT 160. As described above, the purge signal 165 may be provided to a controller associated with the LNT 160 which is arranged to control the purge operation of the LNT 160, such as by controlling a rich lambda (i.e. <1) operation of the ICE, as described above.

In some embodiments of block 1040 a method of determining the schedule for purging the LNT 160 may be performed as illustrated in FIG. 11. The method 1100 will be explained with further reference to FIGS. 12 and 13.

FIGS. 12 and 13 illustrate, in their upper portions, a $NO_x$ load of the LNT 160 over a period of time of a driving cycle. The load is in a range between 0 (unloaded) and a maximum load, which in the example is 2 g of $NO_x$, with it being appreciated that this is merely an example and that other maximum loads are envisaged. The lower portions of FIGS. 12 and 13 illustrate, on their left hand axis, a temperature 1230, 1330 associated with the LNT 160 in the form of a temperature of the exhaust system 190 as may be measured by the temperature sensing device 920. A threshold exhaust temperature 1240, 1340 is also indicated which, in the example, is 220° C. with it being appreciated that other threshold temperatures may be used. On the right hand axis, an indication of the operating efficiency 1250, 1255, 1350, 1355 of the SCR 180 is shown which, at an end of the graph is indicated with an example operating efficiency of 90% as a reference.

FIGS. 12 and 13 illustrate loading 1210, 1310 and unloading 1220, 1320 phases of the LNT 160 when the stored $NO_x$ weight of stored $NO_x$ increases and decreases, respectively.

Returning to FIG. 11, in block 1110 it is determined whether a temperature associated with the LNT 160, such as of the exhaust system 1230, 1330, is relatively high. By relatively high it may be determined whether the temperature is above a predetermined threshold temperature. In FIGS. 12 & 13 the exhaust temperature is above the threshold temperature 1240, 1340 for the first two pairs of loading and unloading phases shown. Thus, the method 1100 moves to block 1120 where load-based purging of the LNT 160 is performed i.e. the LNT 160 is generally purged or unloaded when full. However, at time 1200 in FIG. 12 and time 1300 in FIG. 13 the temperature is below threshold 1340. Thus at time 1200, 1300 method 1000 moves to block 1130.

In block 1130 it is determined whether the SCR 180 is operating efficiently. Block 1130 may consider the operating efficiency of the SCR 180 as explained above with reference to FIG. 8 comprising the conversion efficiency and storage efficiency of the SCR 180. However, in other embodiments, block 1130 may only consider the conversion efficiency, as illustrated in FIGS. 12 & 13 with it being appreciated that this is not restrictive. With reference to FIG. 12, in block 1130 at time 1200 the SCR 180 is operating efficiently. At an initial time, the efficiency of the SCR 180 is low as indicated by reference numeral 1250. By low, it may be determined in some embodiments whether the operating efficiency or conversion efficiency of the SCR 180 is above a predetermined threshold such as 75%, 80% or 85%. At a later period of time, such as at time 1200, the SCR 180 is operating efficiently as indicated by reference numeral 1255. Therefore, $NO_x$ emissions from the ICE are able to be treated by the SCR 180 in the event that the LNT 160 reaches its maximum storage capacity. Thus, with regard to FIG. 12, the method 1100 moves to block 1150, wherein purging of the LNT 160 is delayed due to the relatively low exhaust temperature 1240. Purging of the LNT 160 is delayed to advantageously prevent lambda rich operation of the ICE being performed when the purge or unloading of the LNT 160 will take a long period of time due to the lower exhaust temperature 1240. The relatively long period of lambda rich operation of the ICE may allow excess HC, CO or PM emissions to occur which are prevented by delaying the purge operation of the LNT 160. As illustrated in FIG. 12, the purge of the LNT 160 is delayed until a period of time when the exhaust temperature is relatively high i.e. above the temperature threshold 1240.

Referring to FIG. 13, at time 1300 the SCR efficiency 1350 is currently low, as indicated by reference numeral 1350. Thus the method 1100 moves to block 1140. In block 1140 it is determined whether a predicted efficiency of the SCR 180 is increased. In other words, is it predicted in block 1140 that at a future point in time the SCR 180 will have an operating efficiency or conversion efficiency above the threshold efficiency due to increased temperature of the exhaust system 190 of the vehicle 200. For example, the control system 110 may receive an indication that the route of the vehicle 200 is over a particular length or duration allowing the temperature to increase, includes a high-speed portion, or that a portion of road with increased gradient will be encountered causing the ICE to heat the exhaust system 190. If the efficiency of the SCR 180 is predicted to increase, the method moves to block 1160 wherein an advanced purge of the LNT 170 is performed. The advanced purge is performed to reduce overall $NO_x$ emissions from the vehicle 200. The advanced purge will not require as long a lambda rich operation due to it currently storing a partial volume of $NO_x$. Furthermore, since the LNT 160 is purged it may adsorb $NO_x$ for a longer period afterward, as indicated by period 1370 which allows a later purge operation. Still further, the purge operation may be delayed in a period when the SCR 180 is operating efficiently as indicated by time period between references 1380-1390.

In block 1140, it may be determined that the predicted efficiency of the SCR 180 will not increase in the near future. That is, it may not be determined that a period of efficient SCR 180 operation is predicted. In this situation, one or more actions may be taken in block 1145. It may not be possible to predict an efficient period of SCR 180 operation for one or more reasons. For example, the navigation or e-horizon system may not be available or a destination of the vehicle may arrive before the SCR 180 has heated to a sufficient temperature. The SCR 180 may need a period of time, such as 20 minutes, to reach a light-off or operating temperature and the destination may be reached within this time. The actions may include reducing emissions of oxides of nitrogen from the ICE, such as by increasing EGR rate, altering injection timing, restricting engine speed or torque for example. Other actions may include activating a strategy to heat the SCR 180 by controlling the operation of the ICE.

It can therefore be appreciated that embodiments of the invention determine a schedule and perform a purge operation according to the schedule to reduce emissions particularly, although not exclusively, those associated with lambda rich operation of an internal combustion operation.

The, or each, electronic processor 120 may comprise any suitable electronic processor (e.g., a microprocessor, a microcontroller, an ASIC, etc.) that is configured to execute electronic instructions. The, or each, electronic memory device 130 may comprise any suitable memory device and may store a variety of data, information, threshold value(s), lookup tables or other data structures, and/or instructions therein or thereon. In an embodiment, the memory device 130 has information and instructions for software, firmware, programs, algorithms, scripts, applications, etc. stored therein or thereon that may govern all or part of the methodology described herein. The processor, or each, electronic processor 120 may access the memory device 130 and execute and/or use that or those instructions and information to carry out or perform some or all of the functionality and methodology describe herein.

The at least one memory device 130 may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

Example controllers 110 have been described comprising at least one electronic processor 120 configured to execute electronic instructions stored within at least one memory device 114, which when executed causes the electronic processor(s) 120 to carry out methods as hereinbefore described. However, it is contemplated that the present invention is not limited to being implemented by way of programmable processing devices, and that at least some of, and in some embodiments all of, the functionality and or method steps of the present invention may equally be implemented by way of non-programmable hardware, such as by way of non-programmable ASIC, Boolean logic circuitry, etc.

It will be appreciated that various changes and modifications can be made to the present invention without departing from the scope of the present application.

The invention claimed is:

1. A control system for a vehicle, the control system comprising one or more controller, the control system being arranged to:
determine a likelihood of a NOx adsorber trap of a vehicle requiring purging;
determine an efficiency of purging the NOx adsorber trap;
determine an operating efficiency of a selective catalyst reduction system of the vehicle;
determine a schedule for purging the NOx adsorber trap of the vehicle in dependence on the likelihood of the NOx adsorber trap requiring purging, the efficiency of purging the NOx adsorber trap, and the operating efficiency of the selective catalyst reduction system; and control purging of the NOx adsorber trap according to the schedule.

2. The control system of claim 1, wherein the control system is arranged to determine the efficiency of purging the NOx adsorber trap comprising at least one of:
   determining a current efficiency of purging the NOx adsorber trap, and
   determining a prediction of a future efficiency of purging the NOx adsorber trap.

3. The control system of claim 1, wherein the control system is arranged to determine the efficiency of purging the NOx adsorber trap comprising determining a temperature associated with the NOx adsorber trap.

4. The control system of claim 3, wherein the temperature is a temperature of an exhaust associated with the NOx adsorber trap.

5. The control system of claim 1, wherein the control system is arranged to determine the operating efficiency of the selective catalyst reduction system comprising at least one of:
   determining a current operating efficiency of the selective catalyst reduction system, and
   determining a prediction of a future operating efficiency of the selective catalyst reduction system.

6. The control system of claim 1, wherein the control system is arranged to determine the operating efficiency of the selective catalyst reduction system comprising determining a temperature associated with the selective catalyst reduction system.

7. The control system of claim 1, wherein the control system is arranged to determine the schedule for purging of the NOx adsorber trap comprising at least one of:
   controlling a purge of the NOx adsorber trap prior to said NOx adsorber trap reaching a maximum NOx storage capacity,
   scheduling future purge of the NOx adsorber trap, and
   delaying a purge of the NOx adsorber trap.

8. The control system of claim 7, wherein the purging of the NOx adsorber trap is delayed until:
   the efficiency of purging the NOx adsorber trap improves with respect to a current efficiency of purging the NOx adsorber trap, or
   the operating efficiency of the selective catalyst reduction system is determined or is predicted to improve with respect to a current operating efficiency of the selective catalyst reduction system.

9. The control system according to claim 1 comprised within a selective catalyst reduction system, the selective catalyst reduction system further comprising a NOx adsorber trap controlled by the control system.

10. The control system according to claim 1 comprised within a vehicle.

11. A method for controlling purging of a NOx adsorber trap of a vehicle, comprising:
   determining a likelihood of a NOx adsorber trap of a vehicle requiring purging;
   determining an efficiency of purging the NOx adsorber trap;
   determining an operating efficiency of a selective catalyst reduction system of the vehicle;
   determining a schedule for purging of the NOx adsorber trap of the vehicle in dependence on the likelihood of the NOx adsorber trap requiring purging, the efficiency of purging the NOx adsorber trap, and the operating efficiency of the selective catalyst reduction system; and
   controlling purging of the NOx adsorber trap according to the schedule.

12. The method of claim 11, wherein the determining the efficiency of purging the NOx adsorber trap comprises at least one of:
   determining a current efficiency of purging the NOx adsorber trap, and
   determining a prediction of a future efficiency of purging the NOx adsorber trap.

13. The method of claim 11, wherein the determining the efficiency of purging the NOx adsorber trap comprises determining a temperature associated with the NOx adsorber trap.

14. The method of claim 13, wherein the temperature is a temperature of an exhaust associated with the NOx adsorber trap.

15. The method of claim 11, wherein the determining the operating efficiency of the selective catalyst reduction system comprises at least one of:
   determining a current operating efficiency of the selective catalyst reduction system, and
   determining a prediction of a future operating efficiency of the selective catalyst reduction system.

16. The method of claim 11, wherein the determining the operating efficiency of the selective catalyst reduction system comprises determining a temperature associated with the selective catalyst reduction system.

17. The method of claim 11, wherein determining the schedule for purging of the NOx adsorber trap comprises at least one of:
   controlling a purge of the NOx adsorber trap prior to said NOx adsorber trap reaching
   a maximum NOx storage capacity,
   scheduling future purge of the NOx adsorber trap, and
   delaying a purge of the NOx adsorber trap.

18. The method of claim 11, wherein the purging of the NOx adsorber trap is delayed until:
   the efficiency of purging the NOx adsorber trap improves with respect to a current efficiency of purging the NOx adsorber trap, or
   the operating efficiency of the selective catalyst reduction system is determined or is predicted to improve with respect to a current operating efficiency of the selective catalyst reduction system.

19. A non-transitory, computer-readable storage medium storing instructions thereon that, when executed by one or more electronic processors, causes the one or more electronic processors to carry out the method according to claim 11.

* * * * *